US011135887B2

(12) United States Patent
Aldrich

(10) Patent No.: US 11,135,887 B2
(45) Date of Patent: Oct. 5, 2021

(54) ADJUSTABLE SUSPENSION MOUNT SYSTEM AND METHOD

(71) Applicant: ALA Holdings, LLC, Clifton Park, NY (US)

(72) Inventor: Aaron L. Aldrich, Clifton Park, NY (US)

( * ) Notice: Subject to any disclaimer, the term of this patent is extended or adjusted under 35 U.S.C. 154(b) by 40 days.

(21) Appl. No.: 16/601,811

(22) Filed: Oct. 15, 2019

(65) Prior Publication Data

US 2020/0122536 A1    Apr. 23, 2020

Related U.S. Application Data

(60) Provisional application No. 62/747,850, filed on Oct. 19, 2018.

(51) Int. Cl.
*B60G 9/02* (2006.01)
*B62D 24/04* (2006.01)
*B60G 17/005* (2006.01)
*B62D 21/11* (2006.01)

(52) U.S. Cl.
CPC ............. *B60G 9/02* (2013.01); *B60G 17/005* (2013.01); *B62D 21/11* (2013.01); *B62D 24/04* (2013.01)

(58) Field of Classification Search
CPC .... B60G 9/02; B60G 9/022; B60G 2200/144; B60G 2200/314; B60G 17/005; B60G 2300/38; B60G 2500/30; B60G 9/00; B62D 21/11; B62D 24/04
USPC .......................... 280/86.5, 124.109, 127, 153
See application file for complete search history.

(56) References Cited

U.S. PATENT DOCUMENTS

| | | | |
|---|---|---|---|
| 1,851,655 | A | 3/1932 | Vincent |
| 1,984,565 | A | 12/1934 | Bell |
| 2,146,418 | A | 2/1939 | Chapman |
| 2,621,920 | A | 12/1952 | Hogsten et al. |
| 2,712,946 | A | 7/1955 | Cicero |
| 3,002,762 | A | 10/1961 | Scheel |
| 3,097,839 | A | 7/1963 | Hirst |
| 3,229,992 | A | 1/1966 | Traywich |
| 3,527,316 | A | 9/1970 | Jones, Jr. et al. |
| 3,831,210 | A | 8/1974 | Ow |
| 4,026,368 | A | 5/1977 | Asal |
| 4,102,424 | A | 7/1978 | Heinze |
| 4,359,123 | A | 11/1982 | Haupt et al. |

(Continued)

FOREIGN PATENT DOCUMENTS

| | | |
|---|---|---|
| DE | 4216542 A1 | 12/1992 |
| DE | 19528565 A1 | 2/1996 |

(Continued)

*Primary Examiner* — Paul N Dickson
*Assistant Examiner* — Scott F. Underwood

(57) ABSTRACT

Disclosed herein is an adjustable suspension mount system that includes a subframe for attachment to a suspension device of a vehicle. The system further includes a first and second mount link for attaching the subframe to a frame of a vehicle. A positioning device for attaching to the frame of the vehicle and the subframe is also included. The adjustable suspension mount system may also attach to a second suspension device of the vehicle as well as other further suspension devices. Further disclosed is a vehicle having the adjustable suspension mount system, a kit for providing the adjustable suspension mount system, and methods of using the adjustable suspension mount system for raising and lowering a vehicle.

20 Claims, 3 Drawing Sheets

(56) References Cited

U.S. PATENT DOCUMENTS

| | | | |
|---|---|---|---|
| 4,427,207 A | 1/1984 | Gafford | |
| 4,809,179 A | 2/1989 | Klinger et al. | |
| 4,958,584 A | 9/1990 | Williamson | |
| 5,015,004 A * | 5/1991 | Mitchell | B60G 11/27 280/5.521 |
| 5,284,353 A | 2/1994 | Shinji et al. | |
| 5,310,212 A | 5/1994 | Uno et al. | |
| 5,356,162 A | 10/1994 | Derrien | |
| 5,593,175 A | 1/1997 | Oda et al. | |
| 5,813,698 A | 9/1998 | Spoto et al. | |
| 5,984,330 A | 11/1999 | Hasshi et al. | |
| 6,021,861 A | 2/2000 | Dickson | |
| 6,036,201 A * | 3/2000 | Pond | B60G 3/20 280/5.514 |
| 6,073,946 A * | 6/2000 | Richardson | B60G 11/28 280/124.128 |
| 6,086,075 A | 7/2000 | O'Bryan et al. | |
| 6,176,496 B1 | 1/2001 | Busch | |
| 6,196,555 B1 | 3/2001 | Gaibler | |
| 6,293,562 B1 | 9/2001 | Kutscher | |
| 6,357,768 B1 | 3/2002 | Chan et al. | |
| 6,416,136 B1 | 7/2002 | Smith | |
| 6,418,363 B2 | 7/2002 | Cochofel et al. | |
| 6,418,856 B2 | 7/2002 | Hossfield et al. | |
| 6,530,585 B1 | 3/2003 | Howard | |
| 6,588,777 B1 | 7/2003 | Heyring | |
| 6,619,673 B2 | 9/2003 | Eckelberry et al. | |
| 6,719,313 B2 | 4/2004 | Zadok | |
| 6,722,669 B1 | 4/2004 | Stammreich | |
| 6,752,403 B2 | 6/2004 | Allen et al. | |
| 6,793,228 B2 | 9/2004 | Zadok | |
| 6,817,620 B1 | 11/2004 | Howard | |
| 6,899,191 B1 | 5/2005 | Lykken | |
| 7,185,902 B1 | 3/2007 | Lloyd | |
| 7,240,906 B2 | 7/2007 | Klees | |
| 7,293,780 B2 | 11/2007 | Germain et al. | |
| 7,300,064 B2 | 11/2007 | Johnson et al. | |
| 7,350,792 B1 | 4/2008 | Garman | |
| 7,357,396 B2 | 4/2008 | Dellacha | |
| 7,390,000 B2 | 6/2008 | Lee | |
| 7,401,794 B2 | 7/2008 | Laurent et al. | |
| 7,475,894 B2 | 1/2009 | Hodge | |
| 7,549,659 B2 | 6/2009 | Reineck | |
| 7,648,149 B2 | 1/2010 | Ryberg et al. | |
| 7,934,743 B1 | 5/2011 | Wall et al. | |
| 8,042,817 B2 | 10/2011 | Motebennur et al. | |
| 8,047,551 B2 | 11/2011 | Morris et al. | |
| 8,317,207 B2 | 11/2012 | Mercier | |
| 8,733,768 B1 | 5/2014 | Shoulders | |
| 9,096,261 B2 | 8/2015 | Aldrich | |
| 9,150,247 B2 | 10/2015 | Aldrich | |
| 9,162,705 B2 | 10/2015 | Aldrich | |
| 9,844,992 B2 | 12/2017 | Aldrich | |
| 2002/0047303 A1 | 4/2002 | Takashi et al. | |
| 2005/0139409 A1 | 6/2005 | Bogue | |
| 2005/0156397 A1 * | 7/2005 | Vilardell | B60G 9/02 280/124.107 |
| 2006/0249922 A1 * | 11/2006 | Hinz | B60G 9/04 280/124.116 |
| 2009/0102152 A1 | 4/2009 | Ryan | |
| 2009/0179396 A1 * | 7/2009 | Gottschalk | B62D 7/144 280/86.5 |
| 2010/0136858 A1 * | 6/2010 | King | B60F 3/003 440/12.5 |
| 2014/0306413 A1 | 10/2014 | Aldrich | |
| 2014/0306414 A1 | 10/2014 | Aldrich | |
| 2014/0306415 A1 * | 10/2014 | Aldrich | B60G 9/022 280/124.116 |
| 2016/0101661 A1 | 4/2016 | Aldrich | |
| 2018/0222274 A1 * | 8/2018 | Davis | B60G 17/0408 |

FOREIGN PATENT DOCUMENTS

| | | | |
|---|---|---|---|
| EP | 0432519 A1 | 6/1991 | |
| GB | 2134052 A * | 8/1984 | B60F 3/003 |
| GB | 2134052 A | 8/1984 | |
| WO | 9429161 | 12/1994 | |

* cited by examiner

ADJUSTABLE SUSPENSION MOUNT SYSTEM AND METHOD

CROSS-REFERENCE TO RELATED APPLICATIONS

This application claims priority to U.S. Provisional Application No. 62/747,850 filed Oct. 19, 2018, titled "ADJUSTABLE SUSPENSION MOUNT SYSTEM AND METHOD."

FIELD OF THE DISCLOSURE

The subject matter disclosed herein relates generally to land vehicles. More particularly, the present disclosure concerns land vehicles with an adjustable ride height.

BACKGROUND

Conventional land vehicles include a frame with axles and multiple wheels. The frame is suspended from the axle and wheel assemblies at a given ride height, i.e. ground clearance. Traditionally the ride height of a vehicle is fixed. However, adjustable ride height systems allow for the ride height of a vehicle to be altered.

The ability to adjust the ride height of a land vehicle provides several advantages. Increasing the ride height allows a vehicle to travel over more significant obstacles, e.g. rocks, bumps, downed trees, streams, and other irregularities in the surface over which the vehicle is traveling. An increased ride height also allows a vehicle to operate with larger tires for enhanced off road capability. Decreasing the ride height of a vehicle provides a lower roll center for increased stability and cornering capability, which may be desired for high speed travel over smooth surfaces.

Unfortunately, traditional systems used to adjust the ride height of a vehicle suffer from a limited amount of ride height adjustment capability without significant effort. Additionally, traditional systems used to adjust ride height result in detrimental effects to ride quality, wheel positioning, and/or steering alignment. Still further, traditional systems may not be effective with multiple suspension devices or may fail to keep the suspension devices properly positioned and aligned.

SUMMARY

According to one aspect, a vehicle comprises a frame, an axle, a first suspension device attached to the axle, and an adjustable suspension mount system, and the adjustable suspension mount system includes a subframe attached to the first suspension device; a first mount link pivotally attached to the frame and pivotally attached to the subframe; a second mount link pivotally attached to the frame and pivotally attached to the subframe; and a positioning device attached to the frame and attached to the subframe.

According to another aspect, an adjustable suspension mount kit for a vehicle comprises a subframe attachable to a first suspension device of a vehicle; a first mount link pivotally attachable to a frame of the vehicle and pivotally attachable to the subframe; a second mount link pivotally attachable to the frame of the vehicle and pivotally attachable to the subframe; and a positioning device attachable to the frame of the vehicle and attachable to the subframe.

According to another aspect, an adjustable suspension mount system comprises a subframe attachable to a first suspension device of a vehicle; a first mount link pivotally attachable to a frame of the vehicle and pivotally attached to the subframe; a second mount link pivotally attachable to the frame of the vehicle and pivotally attached to the subframe; and a positioning device attachable to the frame of the vehicle and attached to the subframe.

According to another aspect, a method of raising or lowering a ride height of a vehicle comprises attaching a subframe to a first suspension device of a vehicle; pivotally attaching a first mount link to a frame of the vehicle and pivotally attaching the first mount link to the subframe; pivotally attaching a second mount link to the frame of the vehicle and pivotally attaching the second mount link to the subframe; and attaching a positioning device to the frame of the vehicle and attaching the positioning device to the subframe; wherein the first mount link, second mount link, and positioning device are configured to rotate between a raised and lowered position, wherein the frame is raised relative to the subframe in the raised position relative to the lowered position, and wherein the first suspension device remains substantially vertical relative to the frame in each of the raised position and lowered position.

BRIEF DESCRIPTION OF THE DRAWINGS

The subject matter which is regarded as the invention is particularly pointed out and distinctly claimed in the claims at the conclusion of the specification. The foregoing and other features and advantages of the invention are apparent from the following detailed description taken in conjunction with the accompanying drawings in which:

DETAILED DESCRIPTION

A description of the hereinafter described embodiments of the disclosed device and method are presented herein by way of exemplification and not limitation with reference to the provided Figures.

Figure 1:
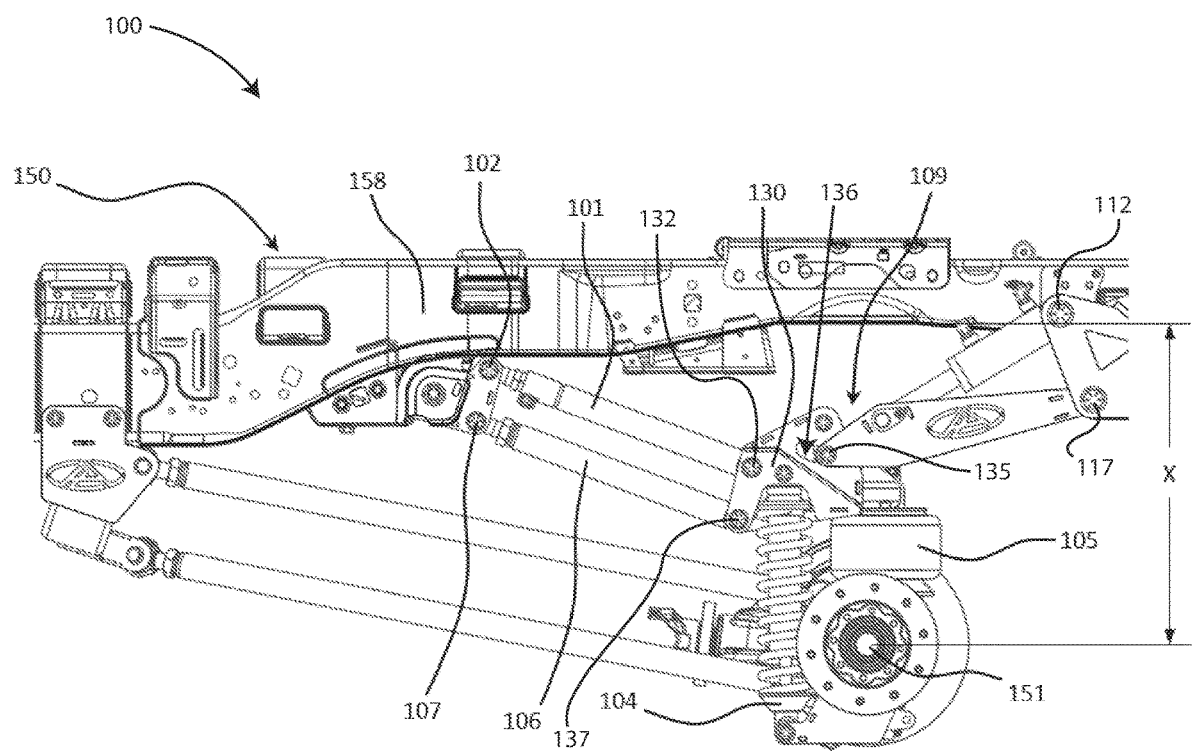
FIG. 1 depicts an adjustable suspension mount system in use in a raised position respective to a vehicle frame in accordance with an embodiment.
Figure 2:
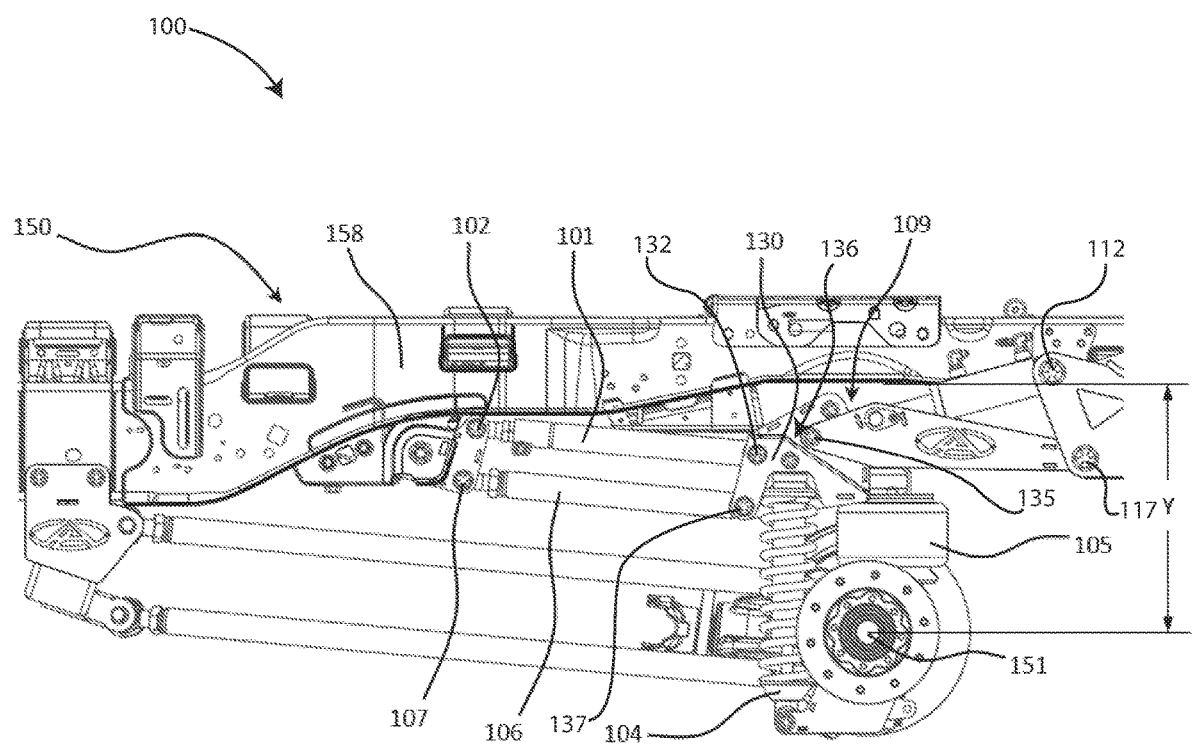
FIG. 2 depicts the adjustable suspension mount system of FIG. 1 in use in an intermediate position respective to the vehicle frame in accordance with an embodiment.
Figure 3:
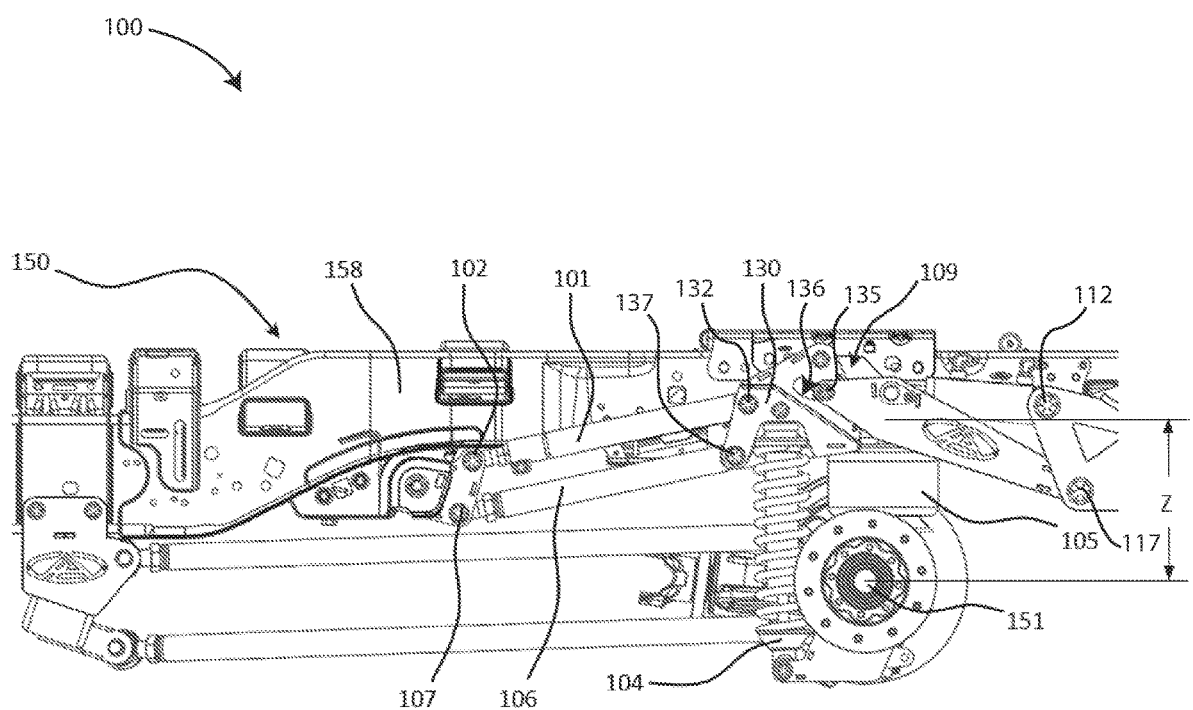
FIG. 3 depicts the adjustable suspension mount system of FIGS. 1 and 2 in use in a lowered position respective to the vehicles frame in accordance with an embodiment.

Referring generally to FIGS. 1-3, an adjustable suspension mount system 100 is shown. The adjustable suspension mount system 100 may be used with a land vehicle 150 having an adjustable ride height. The adjustable suspension mount system 100 may be used in conjunction with, or as an alternative to, conventional suspension mounts. The adjustable suspension mount system 100 may provide a simple and reliable means of achieving significant ride height adjustment without the need to remove and replace components, and without overly complicated mechanisms.

In some embodiments, the adjustable suspension mount system 100 may allow for two or more suspension devices to be used simultaneously on the land vehicle 150. For example, the adjustable suspension mount system 100 may allow for the use of both a coilover-type suspension device and an air bag-type suspension device to be used simultaneously.

Referring now to FIG. 1, the adjustable suspension mount system 100 is shown in accordance with an embodiment of the present invention. The adjustable suspension mount system 100 may comprise a first mount link 101 pivotally attached to a first mount feature 102. The adjustable suspension mount system 100 may further comprise a second mount link 106 pivotally attached to a second mount feature 107. The first mount feature 102 and/or the second mount feature 107 may be formed as a part of a frame 158 of the land vehicle 150 or may be attached to the frame 158 of the land vehicle 150. In some embodiments, the first mount feature 102 and the second mount feature 107 may be fixed, that is incapable of movement, both with respect to each other and with respect to the frame 158. The first mount feature 102 and the second mount feature 107 may be separated from each other by a distance. In one embodiment, the first mount features 102 and the second mount feature may be attached to, or part of, a single feature having a distance, such that the first mount feature 102 is located a distance from the second mount feature 107.

The first mount link 101 may extend away from the first mount feature 102 toward a subframe 130 and may connect to the subframe 130. Likewise, the second mount link 106 may extend away from the second mount feature 107 toward the subframe 130 and may connect to the subframe 130. The first mount link 101 and the second mount link 106 may be connected to the subframe 130 such that the first mount link 101 and the second mount link 106 are pivotally attached to the subframe 130. In some embodiments, the first mount link 101 may connect to the subframe 130 at a first subframe mount feature 132. The second mount link 106 may connect to the subframe 130 at a second subframe mount feature 137.

In some embodiments, the first mount link 101 and the second mount link 106 may have the same length or substantially the same length. Further, the first mount link 101 and the second mount link 106 may be of a fixed length. In embodiments where the first mount link 101 and the second mount link 106 have the same length, the first subframe mount feature 132 may be separated from the second subframe mount feature 137 by the same distance or substantially the same distance that separates the first mount feature 102 and the second mount feature 107.

In further embodiments, the first mount link 101 and the second mount link 106 may be replaceable by other links having a different length to facilitate different levels of increase/decrease in ride height. In still further embodiments, the first mount link 101 and/or the second mount link 106 may have an adjustable length. For example, the first mount link 101 and/or the second mount link 106 may have components that are adjustable, extendable, telescopic, hydraulic, or the like.

The subframe 130 may be configured for attachment to at least a first suspension device 104. The first suspension device 104 may be used to support a load on a first axle 151 of the land vehicle 150. The axle 151 may in turn be connected to a wheel assembly (not shown) and other components of the land vehicle 150. The first suspension device 104 may be a coil over as depicted in the FIGs. In some embodiments, other types of suspension devices may be used, for example, a spring, a shock absorber, a strut, an air bag, and the like. The first suspension device 104 may be generally vertical with respect to the frame 158 to support the load on the first axle 151. The first suspension device 104 may be pivotally attached to the subframe 130. The pivotal attachment between the first suspension device 104 and the subframe 130 may allow for minor movement of the subframe 130 and the first suspension device 104 relative to each other. Thus, the pivotal attachment may keep the first suspension device 104 generally vertical with respect to the frame 158.

The adjustable suspension mount system 100 may further comprise a positioning device 109. In general, the positioning device 109 may extend between and connect to both the frame 158 and the subframe 130. The positioning device 109 may connect to the frame 158 at a different location than the first mount feature 102 and second mount feature 107. The positioning device 109 may be pivotally attached to the frame 158 and may also be pivotally attached to the subframe 130, as described in more detail below.

The positioning device 109 may be any component capable of extending between the frame 158 and the subframe 130 and providing further support to the subframe 130. Still further, the positioning device 109 may be telescopic or extendable, or may include a telescopic or extendable component. For example, in some embodiments, the positioning device may be a hydraulic ram, strut, arm, or the like. In one embodiment, the positioning device 109 may itself be an existing adjustable suspension mount system such as that described in U.S. Pat. No. 9,162,705 (for example, at Cols. 3-4, 6-8, and 10 as well as FIGS. 8-12B and 20A-21B), U.S. Pat. No. 9,844,992 (for example, at Cols. 3-4, 6-8, and 10-11 as well as FIGS. 8-12B and 20A-21B), a modification thereof, or a similar device.

In some embodiments, the positioning device 109 may include at least a first positioning device mount feature 112. Further, the positioning device 109 may include a second positioning device mount feature 117 in some embodiments. The first positioning device mount feature 112 and/or the second positioning device mount feature 117 may be formed as a part of a frame 158 of the land vehicle 150 or may be attached to the frame 158 of the land vehicle 150, thereby connecting the positioning device 109 to the frame 158 of the vehicle 150.

The positioning device 109 may connect to the subframe 130 at a positioning device subframe mount feature 135. The positioning device subframe mount feature 135 may provide for pivotal attachment of the positioning device 109 to the subframe 130. Additionally or alternatively, in some embodiments, such as the embodiment depicted, the positioning device subframe mount feature 135 may allow for other movement of the positioning device 109 and the subframe 130 relative to each other. For example, in the embodiment depicted the subframe 130 may include a shackle 136. The shackle 136 may be a groove, channel, or other component that allows the positioning device subframe mount feature 135 to move within the subframe. For example, in the embodiment shown, the positioning device subframe mount feature 135 may move in a generally horizontal manner through the arc limited by the shackle 136. This movement may be in addition to or in the place of the telescopic and/or pivotal movement of the positioning device 109.

Like the first mount link 101 and the second mount link 106, the positioning device 109 may be replaceable, meaning that different positioning device types or sizes may be used to achieve different levels of increase/decrease in ride height. Thus, the positioning device 109 may be variable, either by replacement or adjustment/extension as described above. It will be understood that the appropriate type or size of the positioning device 109 may be influenced by or dependent on the length chosen for the first mount link 101 and/or the second mount link 106.

The pivotal attachments between the frame 158 and the first mount link 101 (for example, at the first mount feature 102), second mount link 106 (for example, at the second mount feature 107), and positioning device 109 on the one hand (for example, at the first positioning device mount feature 112 and/or the second positioning device mount feature 117), and the pivotal attachments between the subframe 130 and the first mount link 101 (for example, at the first subframe mount feature 132), second mount link 106 (for example, at the second subframe mount feature 137), and positioning device 109 (for example, at the positioning device subframe mount feature 135) on the other hand, may allow for generally vertical movement of the subframe 130 and the first suspension device 104 together with generally vertical movement of the axle 151 and any connected wheel assembly (not shown). The subframe 130 may keep the first suspension device 104 in position during the generally vertical movement, for example, keeping the suspension device 104 generally or substantially vertical with respect to the frame 158 and keeping the suspension device 104 in proper position to support the load on the axle 151.

Referring now to FIGS. 1-3 together, the adjustable suspension mount system 100 is shown with the vehicle 150 in varying ride heights. FIGS. 1-3 will be discussed as a sequence to demonstrate operation of the adjustable suspension mount system 100 according to the depicted embodiments. It will be understood that FIGS. 1-3 respectively show the vehicle 150 with a higher ride height (FIG. 1), an intermediate ride height (FIG. 2), and a lower ride height (FIG. 3). In FIG. 1, the higher ride height includes a distance of X between the frame 158 and the axle 151. In FIG. 2, the intermediate ride height includes a distance of Y between the frame 158 and the axle 151. In FIG. 3, the low ride height includes a distance of Z between the frame 158 and the axle 151. As shown in the Figures, distance X may be greater than distance Y which may be greater than distance Z. When the vehicle 150 has a higher ride height, the subframe 130 may be said to be in a lowered position (FIG. 1). When the vehicle 150 has an intermediate ride height, the subframe 130 may be said to be in an intermediate position (FIG. 2). When the vehicle 150 has a lower ride height, the subframe 130 may be said to be in a raised position (FIG. 3).

Turning to the individual figures more specifically, FIG. 1 depicts the vehicle 150 in a higher ride height according to an embodiment. The subframe 130 is in a lowered position relative to the frame 158 in the depicted embodiment. In this embodiment, the first mount link 101 and second mount link 106 are positioned such that the connections to the first subframe mount feature 132 and second subframe mount feature 137 are lower than the first mount feature 102 and second mount feature 107, with the first mount link 101 and second mount link 106 extending at a downward angle toward the subframe 130. The positioning device 109 is also positioned in a downward angle toward the subframe 130. Further, the positioning device subframe mount feature 135 may be positioned toward a first side of the shackle 136.

FIG. 2 depicts the vehicle 150 in a ride height lower than that shown in FIG. 1 according to an embodiment. The ride height shown in FIG. 2 is still higher than that shown in FIG. 3, and the embodiment of FIG. 2 is therefore referred to herein as an intermediate ride height. In this embodiment, the subframe 130 is in a raised position relative to its position in FIG. 1, i.e., the subframe 130 is closer to the frame 158 thereby bringing the axle 151 and any connected wheel assembly closer to the frame 158. The first mount link 101 and second mount link 106 extend downward at a shallower angle than the downward angle shown in FIG. 1. The shallower angle of the first mount link 101 and the second mount link 106 is achieved by pivotal movement at the first mount feature 102, second mount feature 107, first subframe mount feature 132, and second subframe mount feature 137. The positioning device 109 also extends downward in a shallower angle than the downward angle shown in FIG. 1. The shallower angle of the positioning device 109 is achieved by or includes, at least in part, pivotal movement at the first positioning device mount feature 112, the second positioning device mount feature 117, and the positioning device subframe mount feature 135. As shown, in some embodiments, the shallower downward angle may also be achieved by, or include, movement of the positioning device subframe mount 135 in the shackle 136. For example, as shown in the depicted embodiment, the positioning device subframe mount 135 may move to a second side of the shackle 136 that is opposite the side of the shackle 136 shown in FIG. 1.

FIG. 3 depicts the vehicle 150 in a lower ride height according to an embodiment. The subframe 130 is in a maximally raised position, or close to the maximally raised position, being raised in comparison to both FIG. 2 and FIG. 1. The subframe 130 is thus closer to the frame 158 than in either FIG. 2 or FIG. 1, thereby bringing the axle 151 and any connected wheel assembly closer to the frame 158 as well.

In some embodiments, when the subframe 130 is in the maximally raised position, or close to the maximally raised position, such as that shown in FIG. 3, the first mount link 101 and second mount link 106 may extend toward the subframe 130 at an upward angle. The upward angle may be achieved by pivotal movement at the first mount feature 102, second mount feature 107, first subframe mount feature 132, and second subframe mount feature 137. It will be understood that in some embodiments, the first mount link 101 and second mount link 106 may not extend toward the subframe 130 at an upward angle when the subframe 130 is in the maximally raised position—for example, in some embodiments, even when the subframe 130 is in the maximally raised position, the first mount link 101 and second mount link 106 may still extend downward; however, the angle at which the first mount link 101 and second mount link 106 extend may be shallower than the angle when the subframe 130 is in a lowered or intermediate position.

In some embodiments, when the subframe 130 is in or close to the maximally raised position such as that shown in FIG. 3, the positioning device 109 may also extend toward the subframe 130 at an upward angle. The upward angle of the positioning device 109 may be achieved by or includes, at least in part, pivotal movement at the first positioning device mount feature 112, the second positioning device mount feature 117, and the positioning device subframe mount feature 135. As shown, in some embodiments, the upward angle may also be achieved by, or include, movement of the positioning device subframe mount 135 in the shackle 136. For example, as shown in the depicted embodiment, the positioning device subframe mount 135 may move back to the first side of the shackle 136 and may thus be in the same position as when the subframe 130 was in the lowered position shown in FIG. 1.

It will be understood that in some embodiments, the positioning device 109 may not extend toward the subframe 130 at an upward angle when the subframe 130 is in the maximally raised position—for example, in some embodiments, even when the subframe 130 is in the maximally raised position, the positioning device 109 may still extend downward; however, the angle at which the positioning device 109 extends may be shallower than the angle when the subframe 130 is in a lowered or intermediate position.

The adjustable suspension mount system 100 may be able to easily move from the position shown in FIG. 1 to the position shown in FIG. 3 and back again. Further, the adjustable suspension mount system 100 may be able to stop at any position in between the positions shown in the FIGs In some embodiments, the adjustable suspension mount system 100 may have a set number of positions and may move between the set number of positions. Further, the adjustable suspension mount system 100 may ensure the first suspension device 104 remains vertical or substantially vertical relative to the frame in each and any position and/or during the movement between positions. Thus, the adjustable suspension mount system 100 may ensure that the first suspension device 104 is properly positioned and aligned during travel as well as during any raising or lowering of the vehicle.

In some embodiments, the subframe 130 may be configured for attachment to a second suspension device 105 as well as the first suspension device 104. The second suspension device 105 may be a suspension device of the same type as the first suspension device 104 or may be a suspension device of a different type. For example, in the embodiment depicted, the first suspension device 104 is a coilover-type suspension device and the second suspension device 105 is an air bag-type suspension device. Other types and/or combinations of suspension devices may be used. Further, additional suspension devices may also be used in some embodiments, for example, a third suspension device (not shown) and/or a fourth suspension device (not shown), etc.

In some embodiments, the subframe 130 may be pivotally attached to the second suspension device 105 or may be fixedly attached to the second suspension device 105. In the embodiment shown, the subframe 130 is attached to the second suspension device 105 in a rigid or fixed manner such that the subframe 130 and the second suspension device 105 do not move relative to each other. In the depicted embodiment, the second suspension device 105 is an air bag type-suspension device, and may be comprised, for example, of a flexible material. Thus, the second suspension device 105 may be capable of minor flexing or other movement during the generally vertical movement of the subframe 130 while still maintaining proper positioning and alignment, i.e., still maintaining a generally or substantially vertical orientation with respect to the frame 158 and still properly supporting the load on the axle 151.

As described above, the subframe 130 may provide a stable support for both or all of the suspension devices and may also serve to keep the suspension devices properly positioned and aligned regardless of the ride height and during adjustment of the ride height. For example, the adjustable suspension mount system 100 may ensure the first suspension device 104 and/or the second suspension device 105 remain vertical or generally/substantially vertical relative to the frame 158 in each and any position and also during the movement between positions. Thus, the adjustable suspension mount system 100 may ensure that the first suspension device 104 and/or the second suspension device 105 are properly positioned and aligned during any raising or lowering of the vehicle 150.

In some embodiments, the positioning device 109 may be attached to the frame 158 at a location proximate to the second suspension device 105, while the first mount feature 102 and/or the second mount feature 107 may be attached to the frame 158 at a location proximate to the first suspension device 104. Other configurations and attachment locations may also be used.

The adjustable suspension mount system 100 may include a control system for controlling the rotation, extension, or other movement of the components and for moving the adjustable suspension mount system between varying ride heights.

Still further, in some embodiments, the components of the present invention may be provided in a kit in some embodiments. This kit may be purchasable by a consumer and installed in a vehicle, for example, as a replacement for other suspension mount systems. The kit (not shown) may include, for example, a subframe (such as the subframe 130) attachable to a first suspension device of a vehicle (such as the first suspension device 104; a first mount link (such as the first mount link 101) pivotally attachable to a frame of the vehicle and pivotally attachable to the subframe; a second mount link (such as the second mount link 106) pivotally attachable to the frame of the vehicle and pivotally attachable to the subframe; and a positioning device (such as the positioning device 109) attachable to the frame of the vehicle and attachable to the subframe. In some embodiments, the subframe of the kit may be attachable to a second suspension device of the vehicle (such as the second suspension device 105). The kit may also include first and second mount features (such as the first mount feature 102 and the second mount feature 107), first and second subframe mount features (such as the first subframe mount feature 132 and the second subframe mount feature 137), a positioning device subframe mount feature (such as the positioning device subframe mount feature 135), and/or a shackle (such as the shackle described above). It will be understood that the kit may contain some, any, or all of the components described above. Further, the kit may include a control system for controlling the rotation, extension, or other movement of the components.

In still further embodiments, methods are contemplated. The method may include providing some or all of the components described above. The method may include attaching a subframe (such as the subframe 130) to a first suspension device of a vehicle (such as the first suspension device 104); pivotally attaching a first mount link (such as the first mount link 101) to a frame of the vehicle and pivotally attaching the first mount link to the subframe; pivotally attaching a second mount link (such as the second mount link 106) to the frame of the vehicle and pivotally attaching the second mount link to the subframe; attaching a positioning device (such as the positioning device 109) to the frame of the vehicle and attaching the positioning device to the subframe. The method may include some or all of the foregoing steps. Still further, in some embodiments, the method may include some or all of the following steps: rotating or pivotally moving the first mount link, second mount link, and positioning device between a raised and lowered position, wherein the frame is raised relative to the first suspension device in the raised position relative to the lowered position, and wherein the first suspension device remains generally or substantially vertical relative to the frame in each of the raised position and lowered position. The method may further include attaching the subframe to a second suspension device (such as the second suspension device 105) in some embodiments. In embodiments having a second suspension device, the second suspension device may also remain generally or substantially vertical in each of the raised and lowered position. Still further, in some embodiments, the method may include providing a control system for controlling the rotation, pivotal movement, extension, or other movement of the components and for moving the adjustable suspension mount system between varying ride heights.

The adjustable suspension mount system 100 described herein may be used with a panhard system or panhard linkage system such as a traditional panhard linkage or the panhard linkage described in U.S. Pat. No. 9,150,247 (for example, at Cols. 3 and 9 as well as FIGS. 14A-14B), modifications thereof, and similar devices.

The adjustable suspension mount system 100 described herein may be used with a steering system or steering linkage system such as a traditional steering linkage or the steering linkage described in U.S. Pat. No. 9,096,261 (for example, at Cols. 3-4 and 9-10 as well as FIGS. 15-19B), modifications thereof, and similar devices.

Further, the adjustable suspension mount system 100 described herein may be used with a steering system having a steering tie bar such as the steering system described in U.S. Pat. No. 10,427,483 (for example, at Cols. 3-4 and 10-17 as well as FIGS. 15, 25A-28) modifications thereof, and similar devices.

Each of the patents referred to herein, namely U.S. Pat. Nos. 9,096,261; 9,150,247; 9,162,70; 9,844,992; and 10,427,483 are hereby incorporated by reference.

Elements of the embodiments have been introduced with either the articles "a" or "an." The articles are intended to mean that there are one or more of the elements. The terms "including" and "having" and their derivatives are intended to be inclusive such that there may be additional elements other than the elements listed. The conjunction "or" when used with a list of at least two terms is intended to mean any term or combination of terms. The terms "first" and "second" are used to distinguish elements and are not used to denote a particular order.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description but is only limited by the scope of the appended claims.

What is claimed is:

1. A vehicle comprising:
a frame, an axle, a first suspension device having a top and a bottom, the bottom being attached to the axle, and
an adjustable suspension mount system, the adjustable suspension mount system including:
a subframe attached directly to the top of the first suspension device;
a first mount link pivotally attached to the frame and pivotally attached to the subframe;
a second mount link pivotally attached to the frame and pivotally attached to the subframe; and
a positioning device attached to the frame and attached to the subframe.

2. The vehicle of claim 1, wherein the first mount link, second mount link, and positioning device rotate between a raised position and a lowered position, wherein the frame is raised relative to the subframe in the raised position relative to the lowered position, and wherein the first suspension device remains substantially vertical relative to the frame in each of the raised and lowered position.

3. The vehicle of claim 1, wherein the positioning device is pivotally attached to at least one of the frame and the subframe.

4. The vehicle of claim 1, further comprising:
a second suspension device attached to the axle, wherein the subframe is attached to both the first suspension device and the second suspension device.

5. The vehicle of claim 4, wherein the first mount link, second mount link, and positioning device rotate between a raised position and a lowered position, wherein the frame is raised relative to the subframe in the raised position relative to the lowered position, and wherein both the first suspension device and the second suspension device remain substantially vertical relative to the frame in each of the raised and lowered position.

6. An adjustable suspension mount kit for a vehicle comprising:
a subframe attachable directly to a top of a first suspension device of the vehicle;
a first mount link pivotally attachable to a frame of the vehicle and pivotally attachable to the subframe;
a second mount link pivotally attachable to the frame of the vehicle and pivotally attachable to the subframe; and
a positioning device attachable to the frame of the vehicle and attachable to the subframe.

7. The adjustable suspension mount kit of claim 6,
wherein the first mount link, second mount link, and positioning device are configured to rotate between a raised position and a lowered position when in use and attached to the frame of the vehicle,
wherein the first mount link, second mount link, positioning device, and subframe are configured to raise the frame relative to the subframe in the raised position relative to the lowered position, and
wherein the subframe is configured to keep the first suspension device substantially vertical relative to the frame in each of the raised and lowered position.

8. The adjustable suspension mount kit of claim 6, wherein the positioning device is pivotally attachable to at least one of the frame and the subframe.

9. The adjustable suspension mount kit of claim 6, wherein the subframe is attachable to a second suspension device of the vehicle.

10. The adjustable suspension mount kit of claim 9,
wherein the first mount link, second mount link, and positioning device are configured to rotate between a raised position and a lowered position when in use and attached to the frame of the vehicle,
wherein the first mount link, second mount link, positioning device, and subframe are configured to raise the frame relative to the subframe in the raised position relative to the lowered position, and
wherein the subframe is configured to keep both the first suspension device and the second suspension device substantially vertical relative to the frame in each of the raised and lowered position.

11. An adjustable suspension mount system comprising:
a subframe attachable directly to a top of a first suspension device of the vehicle;
a first mount link pivotally attachable to a frame of the vehicle and pivotally attached to the subframe;
a second mount link pivotally attachable to the frame of the vehicle and pivotally attachable to the subframe; and
a positioning device attachable to the frame of the vehicle and attached to the subframe.

12. The adjustable suspension mount system of claim 11, wherein the first mount link, second mount link, and positioning device are configured to rotate between a raised position and a lowered position when attached to the frame, wherein the frame is raised relative to the subframe in the raised position relative to the lowered position, and wherein the first suspension device remains substantially vertical relative to the frame in each of the raised and lowered position.

13. The adjustable suspension mount system of claim 11, wherein the positioning device is at least one of pivotally attachable to the frame and pivotally attached to the subframe.

14. The adjustable suspension mount system of claim 11, wherein the subframe is attachable to a second suspension device of the vehicle.

15. The adjustable suspension mount system of claim 14, wherein the first mount link, second mount link, and positioning device are configured to rotate between a raised position and a lowered position when in use and attached to the frame of the vehicle, wherein the first mount link, second mount link, positioning device, and subframe are configured to raise the frame relative to the subframe in the raised position relative to the lowered position, and wherein both the first suspension device and the second suspension device remain substantially vertical relative to the frame in each of the raised and lowered position.

16. A method of raising or lowering a ride height of a vehicle, the method comprising:

attaching a subframe directly to a top of a first suspension device of the vehicle;

pivotally attaching a first mount link to a frame of the vehicle and pivotally attaching the first mount link to the subframe;

pivotally attaching a second mount link to the frame of the vehicle and pivotally attaching the second mount link to the subframe;

attaching a positioning device to the frame of the vehicle and attaching the positioning device to the subframe;

wherein the first mount link, second mount link, and positioning device are configured to rotate between a raised and lowered position, wherein the frame is raised relative to the subframe in the raised position relative to the lowered position, and wherein the first suspension device remains substantially vertical relative to the frame in each of the raised position and lowered position.

17. The method of claim 16, further comprising:

rotating the first mount link, second mount link, and positioning device between the raised position and the lowered position.

18. The method of claim 16, further comprising:

attaching the subframe to a second suspension device.

19. The method of claim 18, wherein both the first suspension device and the second suspension device remain substantially vertical relative to the frame in each of the raised position and lowered position.

20. The method of claim 16, wherein the positioning device is pivotally attached to at least one of the frame and the subframe.

* * * * *